United States Patent [19]
Hartley

[11] Patent Number: 5,398,491
[45] Date of Patent: Mar. 21, 1995

[54] LAWN MOWER SIDE DISCHARGE CHUTE

[75] Inventor: Dean E. Hartley, Marysville, Ohio

[73] Assignee: Honda Giken Kogyo Kabushiki Kaisha, Tokyo, Japan

[21] Appl. No.: 960,327

[22] Filed: Oct. 13, 1992

[51] Int. Cl.$^6$ .............................................. A01D 34/70
[52] U.S. Cl. ............................... 56/320.2; 56/DIG. 9
[58] Field of Search ............... 56/320.2, 320.1, 202, 56/DIG. 5, DIG. 9, DIG. 20, DIG. 24

[56] References Cited

U.S. PATENT DOCUMENTS

| | | | |
|---|---|---|---|
| 4,047,367 | 9/1977 | Thorud | 56/320.2 X |
| 4,897,988 | 2/1990 | Schweitz et al. | 56/202 |
| 5,033,260 | 7/1991 | Jerry | 56/202 X |

FOREIGN PATENT DOCUMENTS

| | | | |
|---|---|---|---|
| 974068 | 9/1975 | Canada | 56/320.2 |
| 60-41077 | 12/1985 | Japan . | |

*Primary Examiner*—Terry Lee Melius
*Attorney, Agent, or Firm*—Armstrong, Westerman, Hattori, McLeland & Naughton

[57] ABSTRACT

A lawn mower having a side discharge chute, has structure for narrowing the passage through the discharge chute, and widening the passage downstream of the narrowed section. A deflector plate is mounted near the intake opening of the discharge chute. The deflector plate extends from the upper portion of the discharge chute downwardly into the path of the mixture of air and grass clippings exiting from the mower housing. The narrowing feature may also be accomplished by an inwardly extending convex portion inside the passage of the chute. This structure causes the mixture of the air and grass clippings to mix more thoroughly, enabling the clippings to exit the discharge chute and to be more evenly distributed when they fall to the ground.

16 Claims, 4 Drawing Sheets

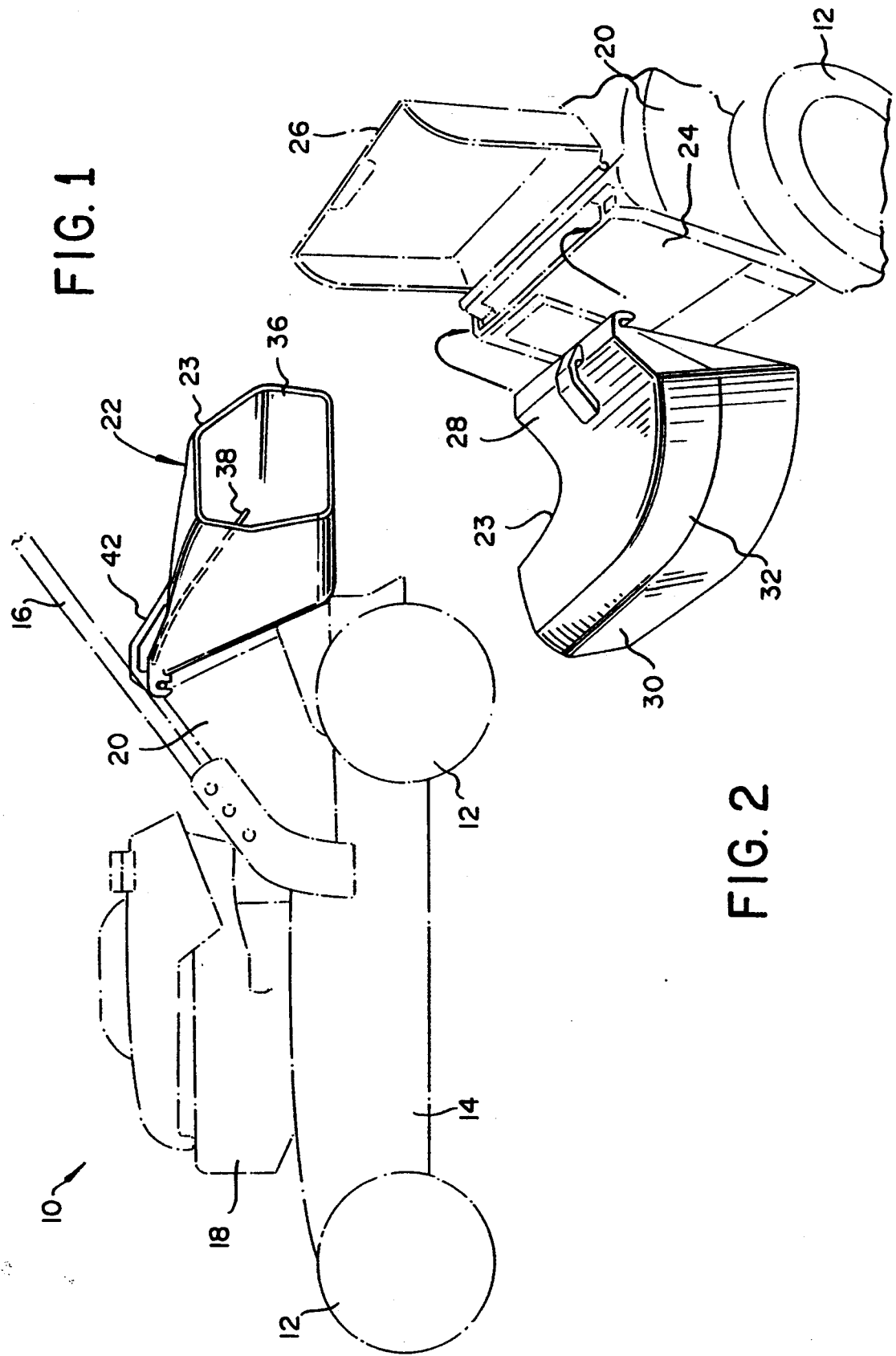

LAWN MOWER SIDE DISCHARGE CHUTE

FIELD OF THE INVENTION

The present invention relates generally to a discharge chute for a lawn mower, and more particularly to a discharge chute which discharges the grass clippings to the side of the lawn mower.

BACKGROUND OF THE INVENTION

Walk-behind lawn mowers have been commonly equipped with a rear grass bag or a discharge chute. In most cases, these items are interchangeable. The rear grass bag arrangement has been beneficial because the rear grass bag allows the operator to maneuver more closely to the trees, hedges and other lawn obstacles. Additionally, the rear grass bag allows the weight of the accumulated grass clippings to be more evenly supported by the rear wheels of the lawn mower, rather than to weigh down a single side as in a side discharge mower. Thus, the rear grass bag arrangement allows for more even cutting of the grass.

Often, in a mower with a rear grass bag arrangement, the rear grass bag attachment may be removed and a discharge chute may be installed in its place. Such a discharge chute commonly expels the grass clippings to the side. In a mower of the rear grass bag type, the exit of the grass clippings from the mower housing is generally provided at the rear of the housing. Thus, when the rear grass bag is attached, the clippings are directly projected into the rear grass bag. When the side discharge chute is attached, instead of the rear grass bag, the clippings are directed into the chute which in turn discharges the clippings to the side. Such side discharge chutes are commonly shaped in the form of a bent tunnel for sidewardly discharging the grass clippings.

Such side discharge chutes, however, are inconvenient in that, because of their shape in the form of a bent tunnel, the clippings are sometimes expelled onto the grass in the form of a windrow as they are being discharged from the chute. Such windows, or the like, extend the time required for the grass clippings to dry out, and is more unsightly when the clippings are not raked up.

The discharge chute provides a path for the cut grass clippings to travel through and to be directed back to the ground. However, as the grass becomes heavy and/or wet, it becomes more difficult for the air flow to carry the grass clippings away. Basically, the air separates from the grass and a row of cut grass forms right below the exit from the discharge chute. In the conventional designs the maximum air flow exits towards the top of the discharge opening. This air flow pattern allows the air and grass to separate prior to exiting the chute and causes the wind rowing (the formation of grass clippings along a line) of the grass.

According to the instant invention, the velocity of the air exiting the discharge opening is generally less. The air becomes more turbulent and it mixes more with the grass clippings before leaving the discharge chute. The greater air velocity occurs generally in the central portion of the discharge opening, thus prolonging the mixing of the air and grass clippings until the grass has exited the chute. The extra mixing action spreads the grass further and more uniformly.

SUMMARY OF THE INVENTION

The present invention overcomes the above problem. The present invention has an improved side discharge chute which enables the grass clippings to be discharged in a wider and more evenly distributed pattern.

Specifically, in the side discharge chute of the instant invention, the passage between the intake opening and the outlet has narrowing structure which causes the passage to be narrowed and then widened in order to promote a greater mixing of the grass clippings and a more even flow of the expelled air and grass clippings from the outlet, in order to allow the discharged clippings to be more evenly distributed along the ground.

When the passage is widened, downstream of the narrowed part, a partial vacuum or a low pressure area is formed. This low pressure area causes turbulence of the air and grass mixture flowing through the chute. This allows the grass clippings to remain suspended longer in the air flow, and thus there is the greater mixing to promote the more even distribution of the clippings on the ground.

In a preferred embodiment, the narrowing structure of the passage is a deflector plate mounted near the intake opening of the discharge chute. The deflector plate of the preferred embodiment extends from the upper portion of the discharge chute downwardly into the path of the mixture of air and grass clippings exiting from the rear of the mower housing. Part of the air/grass mixture is deflected downwardly by the deflector plate causing additional swirling and mixing of the air/grass mixture flowing through the discharge chute. This causes the clippings which exit the discharge chute to be more evenly distributed when they fall to the ground.

In another embodiment, the narrowing structure of the passage is an inwardly extending convex portion molded directly into the discharge chute itself. In other words, rather than the deflector plate described above, a narrowing of the discharge chute may be accomplished by an inwardly extending convex portion. Such convex portion, of course, could be easily molded into the discharge chute itself. However, it is important, that the passage through the discharge chute be widened downstream of the inwardly extending convex portion. The transition from the inwardly extending convex portion to the widened passage may be accomplished by means of a step-like structure or a gradual widening of the passage. A step-like structure is generally preferable.

The instant invention provides for a side discharge chute for a lawn mower having a rear discharge opening. The side discharge chute comprises a chute housing having a passage therethrough for directing grass clippings from the rear discharge opening of the mower to the side of the mower. The side discharge chute of the instant invention also has a narrowing structure provided within the passage through the chute housing, such that the passage has a narrow section and a wider section downstream of the narrow section.

BRIEF DESCRIPTION OF THE DRAWINGS

The advantages of the invention will become apparent in the following description taken in conjunction with the drawings, wherein:

FIG. 1 is a side elevation view of a lawn mower (in phantom) having the side discharge chute of the instant invention;

FIG. 2 is a rear view of the mower with the side discharge chute in position to be attached;

DETAILED DESCRIPTION OF THE PREFERRED EMBODIMENT

Figure 3:
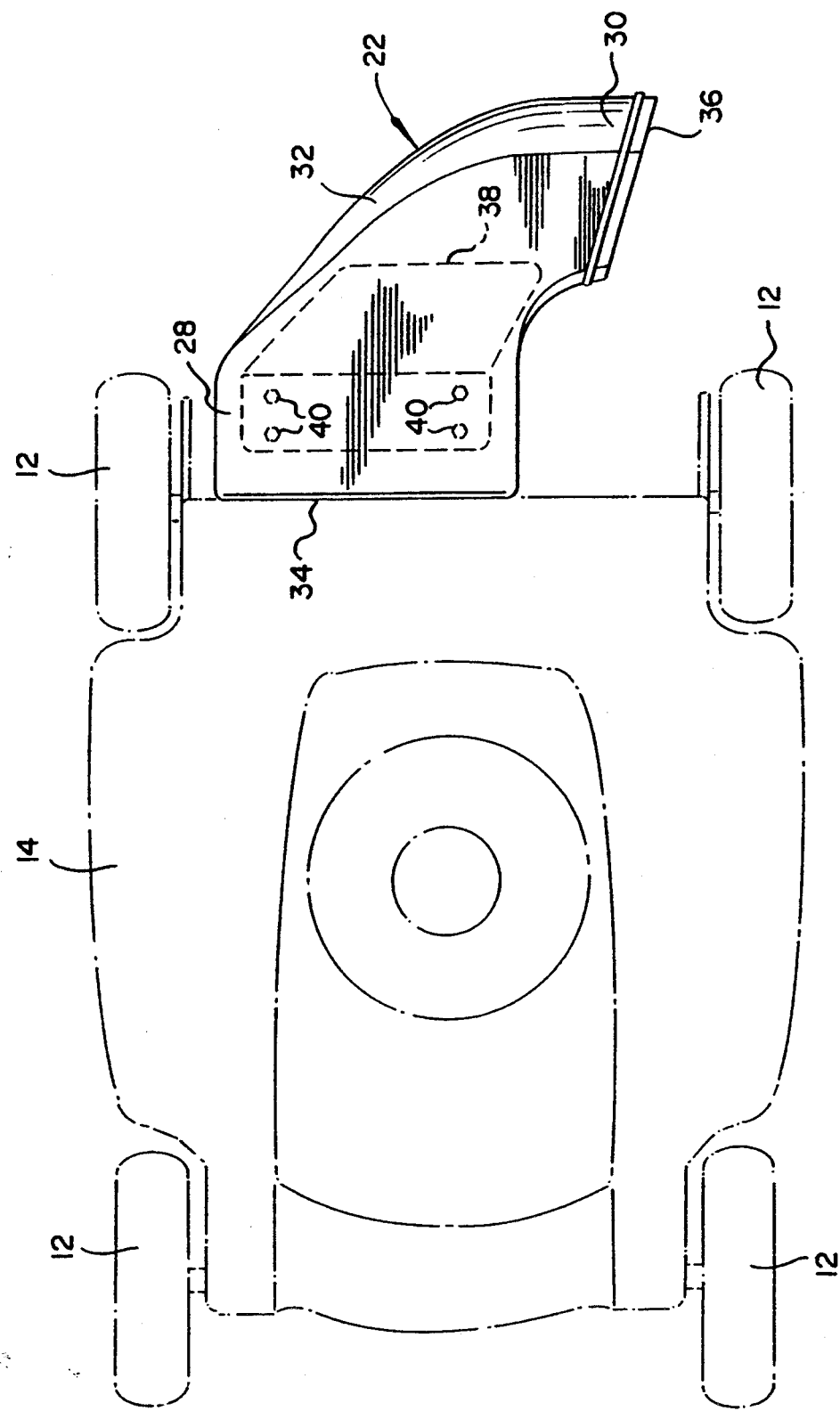
FIG. 3 is a plan view of the mower (in phantom) with the side discharge chute shown at the rear thereof.

A first embodiment of the invention is illustrated in FIGS. 1-5. Specifically, FIG. 1 is a side view of a walk-behind lawn mower 10. Generally, the components of the mower 10 include wheels 12, mower housing 14, handle 16 and engine portion 18. Mower 10 has the general structure of a conventional rotary mower, in which engine 18 drives a generally horizontal blade (not shown) inside of housing 14. As the mower is pushed along the ground on wheels 12, the blade cuts the grass and directs the cut particles or grass clippings up through rear duct 20 which has a rear facing opening 24. In most conventional rotary lawn mowers, either a rear grass bag attachment or a side discharge chute is attached to rear duct 20 in order to receive the clippings discharged from rear facing opening 24 of rear duct 20. A flap 26 is often provided at the top of rear facing opening 24, which flap is often spring biased to cover rear facing opening 24 when neither the rear grass bag attachment or the side discharge chute are being used.

The side discharge chute 22 has a housing 23, as best illustrated in FIGS. 2 and 3 which has an elbow-like shape. It has an entrance section 28, an exit section 30 and a direction changing section 32 connecting the entrance and exit sections. Entrance section 28 has an inlet opening 34 in order to provide an opening to allow the air/grass mixture into the side discharge chute 22. A discharge opening 36 is provided in exit section 30 in order to provide an opening for the air/grass mixture to exit from the discharge chute. Thus, a passage is provided for the air/grass mixture to flow through the housing 23 of the chute 22.

Figure 4:
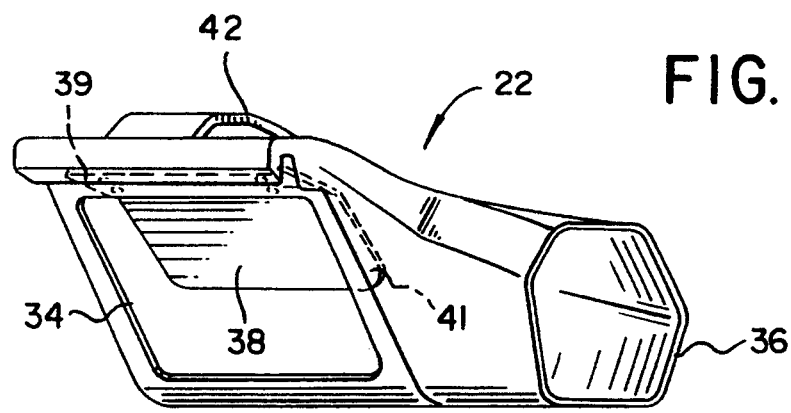
FIG. 4 is a view of the side discharge chute with the deflector plate visible inside.

As best illustrated in FIGS. 1 and 4, the top wall of the side discharge chute 22 is generally angled downwardly. This provides a flow of the air/grass mixture to be directed toward the ground for safety reasons.

Figure 5:
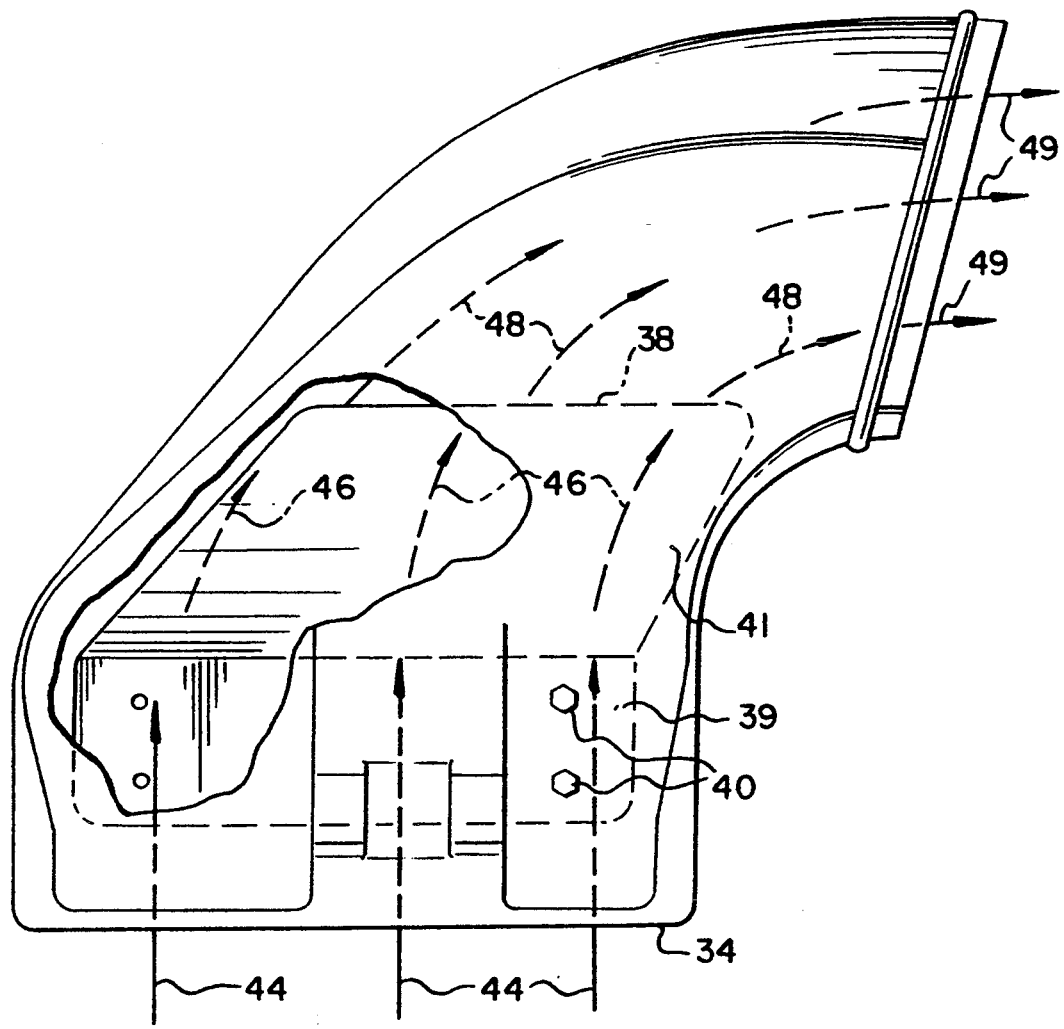
FIG. 5 is a plan view of the side discharge chute indicating the air flow therethrough.

In one embodiment of the invention, a deflector plate 38 is positioned inside the side discharge chute housing 23, downstream from the inlet opening 34. A preferred position for the deflector plate 38 is to extend downwardly from the top portion of the discharge chute 22 into the air/grass mixture. The positioning of deflector plate 38 is best illustrated in FIGS. 1, 3, 4 and 5. In a preferred form, deflector plate 38 has a mounting section 39 and a main section 41 as seen in FIG. 5. Mounting section 39 may be attached to the upper portion of the discharge chute 22 by way of bolts or screws 40. As can be seen from FIGS. 3 and 5, the main section of deflector plate 38, which extends downwardly into flow of the air/grass mixture, also may be angled to follow the curvature of the discharge chute itself. Any other acceptable method of attaching deflector plate 38 to the discharge chute 22 may also be used. A handle 42 may be used for easy removal of the discharge chute 22 from engagement with rear opening 24 on the back of mower housing 14. As shown in FIGS. 4 and 5, the deflector plate 38 is mounted to the housing 23 near the inlet opening 34 of the entrance section 28.

In operation, when the side discharge chute 22 is properly engaged with mower housing 14, the air/grass mixture enters the discharge chute through inlet opening 34. Arrows 44 (See FIG. 5) indicate the flow of the air/grass mixture into the inlet opening 34 of the discharge chute. Arrows 46 indicate the flow of the air/grass mixture as it passes through a high pressure section in the discharge chute. This high pressure area is caused by the narrowing of the passage through the discharge chute because of the presence of deflector plate 38. Arrows 48 indicate the flow of the air/grass clippings mixture after it has passed the deflector plate 38 and is entering a lower pressure area. The lower pressure area is caused by the subsequent enlarging of the passage through the discharge chute after the deflector plate 38. In fact, the partial vacuum or low pressure area thus created behind the deflector plate increases turbulence of the airflow. The air and grass flowing through the area indicated by arrows 48 continue to mix together because of the turbulent air, which thus helps to prolong that mixing until the grass has exited the chute as shown by arrows 49. The extra mixing action enables the grass clippings to be spread further and more uniformly across the ground.

Because the deflector plate 38 is mounted on only one side, additional flexibility is provided in case foreign objects are projected into the chute. It has been found that the deflector plate 28 enables the flow of the air and grass clippings to remain mixed together for a longer period of time and thus to be spread more evenly along the ground after exiting the chute. The use of deflector plate 38 apparently causes no greater tendency for the chute to become clogged or plugged than under conventional usage without the deflector plate. Even with a conventional discharge chute, clogging or plugging occurs from time to time when mowing tall and/or wet grass.

Figure 6:
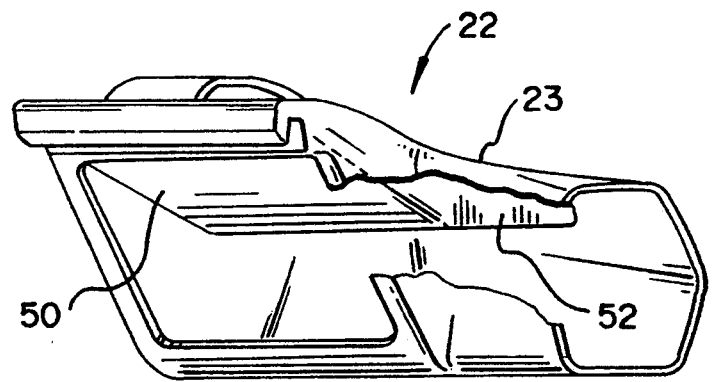
FIG. 6 is a view of an alternate embodiment of the instant invention.
Figure 7:
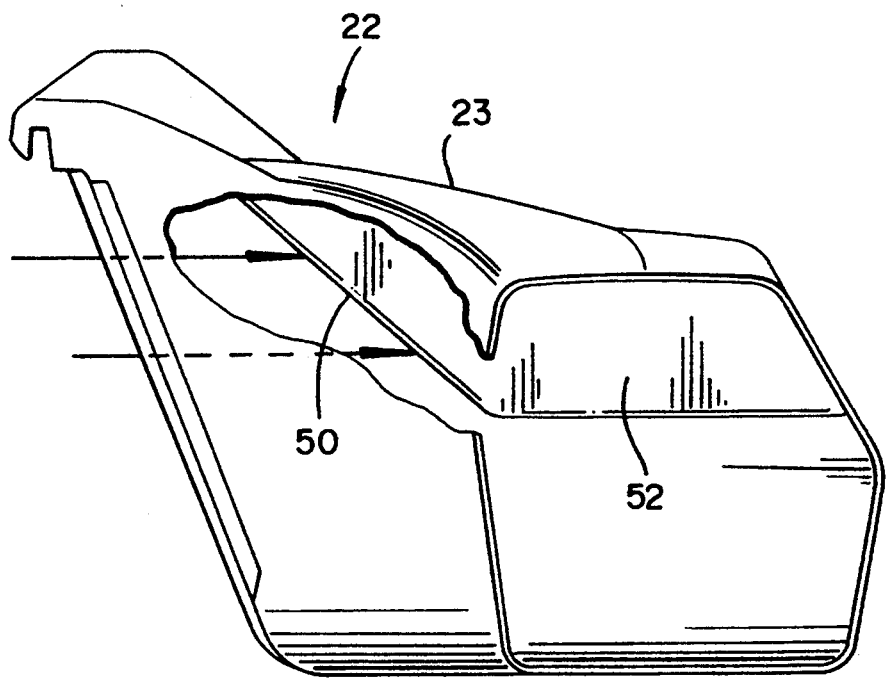
FIG. 7 is a side view of the embodiment of FIG. 6.

FIGS. 6 and 7 illustrate an alternate embodiment of the invention. Housing 23 of side discharge chute 22 has a convex portion 50 extending into the passage through the side discharge chute. The convex portion 50 may be molded directly into the housing 23 of discharge chute 22. Convex portion 50 has a step portion 52 at the downstream end thereof in order to promote further mixing of the grass clippings and air after passing the convex portion 50. While it may be possible to use a more gradual or increased widening of the passage, a step portion 52 is a preferable way of accomplishing this. In other respects, the convex portion 50 operates similar to the deflector plate 38. Of course, convex portion 50 need not be molded directly into housing 23, and may be formed in other ways.

Although specific forms of embodiments of the instant invention have been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention which is determined by the following claims.

I claim:

1. A side discharge chute for a lawn mower having a rear discharge opening, said side discharge chute comprising:

a chute housing having a passage therethrough for directing grass clippings from the rear discharge opening of the mower to the side of the mower;

said chute having an inlet opening and discharge opening;

a narrowing structure provided within said passage;

said narrowing structure extending inward within said passage downstream from said inlet opening, and said chute having a subsequent enlarging of the passage downstream from said narrowing structure which is sufficient to create a low pressure area downstream of said narrowing structure such that said passage has a narrow section and a wider section downstream of said narrow section.

2. The side discharge chute of claim 1, wherein said narrowing structure comprises a deflector plate mounted to said chute housing in said passage and which extends into the flow of air and grass clippings through said passage.

3. The side discharge chute of claim 2, wherein said deflector plate has a mounting section on one side thereof and a main section.

4. The side discharge chute of claim 1, wherein said narrowing structure comprises a convex portion formed inside of said passage.

5. The side discharge chute of claim 4, wherein said convex portion is a unitary structure with said chute housing.

6. The side discharge chute of claim 4, wherein said convex portion is mounted on an upper portion of said chute housing and extends generally downwardly into said passage.

7. The side discharge chute of claim 4, wherein said convex portion has a step at a downstream end thereof.

8. The side discharge chute of claim 7, wherein said convex portion is mounted on an upper portion of said chute housing and extends generally downwardly into said passage.

9. The side discharge chute of claim 1, wherein said narrowing structure is mounted on an upper portion of said chute housing and extends generally downwardly into said passage.

10. The side discharge chute of claim 1, wherein said narrowing structure includes a wall portion which gradually narrows the width of said passage by extending gradually into said passage in the downstream direction of said passage.

11. The side discharge chute of claim 10, wherein said wall portion is mounted on an upper portion of said chute housing and extends generally downwardly into said passage.

12. A side discharge chute for a lawn mower having a rear discharge opening, said side discharge chute comprising:

a chute housing having a passage therethrough for directing grass clippings from the rear discharge opening of the mower to the side of the mower;

structural means, located in said chute, for producing a low pressure area in at least a portion of said chute downstream from said structural means in order to increase turbulence of airflow through said chute;

wherein said structural means comprises a deflector plate mounted to said chute housing in said passage and which extends into the flow of air and grass clippings through said passage;

wherein said deflector plate has a mounting section on one side thereof and a main section; and wherein the upper mounting section of said deflector plate is mounted on an upper portion of said chute housing and the main section thereof extends generally downwardly into said passage.

13. The side discharge chute of claim 12, wherein said mounting section of said deflector plate is mounted to said chute housing near an upstream entrance thereof.

14. A side discharge chute for a lawn mower having a rear discharge opening, said side discharge chute comprising:

chute housing having a passage therethrough for directing grass clippings from the rear discharge opening of the mower to the side of the mower;

a narrowing structure provided within said passage, such that said passage has a narrow section and a wider section downstream of said narrow section;

wherein said narrowing structure comprises a deflector plate mounted to said chute housing in said passage and which extends into the flow of air and grass clippings through said passage;

wherein said deflector plate has a mounting section on one side thereof and a main section and wherein the mounting section of said deflector plate is mounted on an upper portion of said chute housing and the main section thereof extends generally downwardly into said passage.

15. The side discharge chute of claim 14, wherein said mounting section of said deflector plate is mounted to said chute housing near an upstream entrance thereof.

16. A side discharge chute for a lawn mower having a rear discharge opening, said side discharge chute comprising:

a chute housing having a passage therethrough from an inlet opening of said chute to a discharge opening of said chute;

high pressure means for creating a high pressure area within said passage downstream of said inlet opening, said high pressure means including a narrowing means for narrowing the passage downstream of said inlet opening;

low pressure means for creating a low pressure area within said passage downstream of said high pressure means, said low pressure means including a subsequent enlargement of said passage downstream of said narrowing means such that said low pressure means increases the turbulence of the airflow through said passage sufficiently to provide mixing of grass clippings with the air flow through said passage.

* * * * *